July 10, 1962 O. B. SNEATH 3,043,916
COMMUNICATION BY INDUCTION
Filed June 17, 1958 2 Sheets-Sheet 1

INVENTOR
Oswald Barber Sneath
BY [signature]
ATTORNEYS

COMMUNICATION BY INDUCTION

Filed June 17, 1958 2 Sheets-Sheet 2

INVENTOR
Oswald Barber Sneath
BY Stevens, Davis, Miller & Mosher
ATTORNEYS

United States Patent Office 3,043,916

Patented July 10, 1962

3,043,916

COMMUNICATION BY INDUCTION

Oswald Barber Sneath, London, England, assignor to Multitone Electric Company Limited, London, England Filed June 17, 1958, Ser. No. 742,660
Claims priority, application Great Britain June 28, 1957
1 Claim. (Cl. 179—82)

Figure 1:
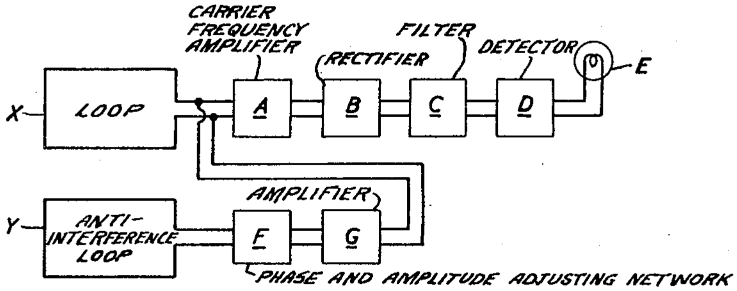

In systems working by magnetic induction for selectively calling one of a number of persons, it is desirable that the person called should be able to indicate that he (or she) has received the call, and sometimes transmit further information by code.

Where speech is used and transmitted from the central system, it is also desirable that the person called shall be able to speak back. In order to achieve intelligible speech, however, it is necessary that the signal transmitter should have a higher level than is required for acknowledgement, or a simple code, and in some cases the interference will be such as to render the speech impossible, or unreliable, where acknowledgement itself is satisfactory. Further, in many cases, the interference background will be subject to variations and for this reason it is an advantage to have provision for acknowledgement with a high degree of discrimination against inteference, in addition to speech. Further, the acknowledgement signal can be used to warn the operator, putting through a selective call, that the callee is about to speak.

The invention accordingly provides apparatus for communication by magnetic induction, wherein a pocket transmitter in, or near a loop can be caused to communicate with a caller by generating an alternating magnetic field of audio, or low radio frequency, by means of a small portable device, such signal being received in the loop system arranged to energise a visual, audio or other indicator. The frequency of the acknowledgement signal may be of the same order as that of the call signal and may be spaced between two call signal frequencies. Where speech is employed, however, it is desirable that the carrier frequency should be at least 15 kc., and may often be considerably higher than the highest call signal. In this case the acknowledgement signal frequency may conveniently be the same as the speech carrier frequency, or fall within the side bands of the speech modulated carrier. Consideration will, however, have to be given to the distribution of local electromagnetic interference in selecting the frequency used for acknowledgement.

The loop may be the same as that used for transmitting calls, although in many cases it will be necessary to take precautions in its layout to reduce the picking-up of external interference, that will be necessary if it were used for transmitting only. The loop is coupled to a very selective pass filter tuned to the acknowledgment frequency and the acknowledgement signal is amplified and caused to operate an indicator. Where speech is employed for replying, this is also amplified at the transmitted frequency and then rectified and received on a telephone, or a loudspeaker, normally by the person making the selective calls.

When the loop is of any substantial size there will usually be considerable stray field due to electromagnetic interference and it is necessary to reduce this as far as possible. Two methods may be resorted to, either separately or, where necessary, jointly. Firstly, different loops may be connected up in series, or in parallel, in such phase that the interference potentials induced in them are largely cancelled out, the size of the loop, if necessary, being arranged to make the interference signals in opposite directions equal. Secondly, one or more small loops, or electromagnetic pick-up devices, e.g. windings on ferrite rods, may be placed in positions outside the field of the loop, and the signal from these amplified and the phase and amplification from them adjusted and fed into the receiver in parallel or series, with the signal from the loop, so that the field due to interference arising at a distance is neutralized. By suitably placing the pick-up devices, interference from sources in close proximity may also be neutralised. Where it is not convenient to place pick-up coils outside the loop, a small neutralizing loop, in series with the main loop, can be placed in position to neutralise the field of the main loop at the pick-up coil.

In many cases, however, after these steps are taken the interference will still be substantial, at least so far as concerns interference with the transmission of normal carrier speech. At a higher level the interference will make all forms of speech transmission impossible. It may, however, still be possible to send out acknowledgment signals, which can be received from the loop, either by the use of an exceedingly selective receiver, tuned to the transmission frequency, or by transmitting signals which are modulated with a fixed frequency and having tuned circuits coupled to the loop, which are selective both to the carrier frequency and the modulation frequency. Further discrimination against interference can be obtained by causing the acknowledgment receiver to be operated only by the signal itself when it is maintained for a second or so.

The advantage in the use of modulated carriers is that if the loop is exceedingly sharply tuned to carrier frequency, a very high degree of stability is required in the portable transmitting device. Similar methods of reception are also applicable both to a very simple form of non-speech acknowledgment device, and also where speech is transmitted.

The acknowledgment transmitter unit must be capable of giving as high a power as possible in a small size. Where speech is to be employed, a transistor oscillator, coupled to a tuned ferrite rod aerial, may be modulated by a transistor amplifier and the same transistor amplifier can be caused to oscillate at a steady frequency by means of a switch, bringing in a tuned feedback circuit in place of a microphone for the purpose of acknowledgment. This apparatus may be powered by one or more small primary or secondary cells, which may be the same cells as are used to power the receiver. The receiver and the acknowledgment transmitter will not be required to work at the same time. Where, however, it is necessary, a higher voltage may be employed for the acknowledgment device. As such device will normally be on only for a second or so, occasionally it is economical to employ quite low-capacity cells, provided they are capable of giving quite heavy instantaneous currents.

Considerable improvement may be obtained in the effective speech-to-interference level, with a given power consumption of the transmitter, by employing emphasized single side-band transmission, although circuits generally employed for almost complete side-band suppression in communication equipment are usually too elaborate for the small transmitter and methods of response of a nature of compromise have to be resorted to. One side-band (for speech) corresponding to audio frequencies of between 800 and 2,400, may advantageously be sent out at about twice, or more, the level of the carrier. The second side-band can be vestigial. The receiver connected to the loop will then be tuned either to have a band-pass extending from the carrier to the transmitted side-bands, corresponding to around 2,000 to 3,000 cycles or, with better advantage, to have two peaks, one of which can be very sharp, corresponding to the carrier frequency, and the other one broader and lower, with its centre corresponding to the peak of the side-bands transmitted.

Even further discrimination against some forms of interference may be effected by having the incoming signals, either immediately or after amplification, with only a moderate degree of selectivity, such as above described, divided into two channels, one of these channels terminating in a limiter stage followed by a highly-selective filter circuit tuned to the carrier frequency, the other channel, without a limiter circuit, feeding a band-pass filter tuned to the side-band transmitted. The signals from these two filters are then mixed and applied to the rectifier.

In general, where speech is employed there will be a substantial background noise heard in the receiver when no speech is being transmitted. While according to known practice the receiver may be designed so as to be quiescent until a carrier of an adequate level is received, this will not allow the reception of speech in the most severe conditions. Ine one form of this invention the speech reception channel is normally switched off and the receipt of an acknowledgment signal switches it on. It then remains switched on either until switched off manually, or is maintained switched on by the presence of the carrier signal and is switched off on the interruption of this signal for a period.

Where the emphasized single side-band transmission is employed for speech, acknowledgment can be effected by modulating the carrier with a speech frequency, and the receiver attached to the loop may contain in the path operating the acknowledgment indicator a filter, sharply tuned either to the frequency of the side-band produced by this note, or to the note itself.

The portable transmitter for producing the emphasized side-band signal may consist of a transistor oscillator modulated by the speech signal, which oscillator is coupled through a filter, which partially eliminates the carrier, to an output stage coupled to a ferrite core tuned to the middle of the side-band to be emphasized.

Where speech is not required, a simple form of the invention may be used, in which a resonance circuit is excited by a pulse of current. In one arrangement this resonance circuit consists of a ferrite-cored coil, with a low loss tuning condenser connected across it. A source of electromotive force, for example, a small accumulator, is also connected across the coil for a fraction of a second, causing a current to build up in the inductance. When the battery circuit is broken, the power in the inductance is expended in a damped oscillation in the tuned circuit.

In a modified arrangement, the current is caused to flow through a small part only of the total tuned coil. This enables a larger tuned coil to be used and tuned with a small adjustable condenser.

The battery contact may be attached to a mechanically tuned vibrator, such as a tuning fork or reed, which preferably has a frequently considerably less than the frequency of oscillation of the tuned coil divided by its "Q." This causes a low frequency modulation of the higher frequency carrier.

Figure 2:
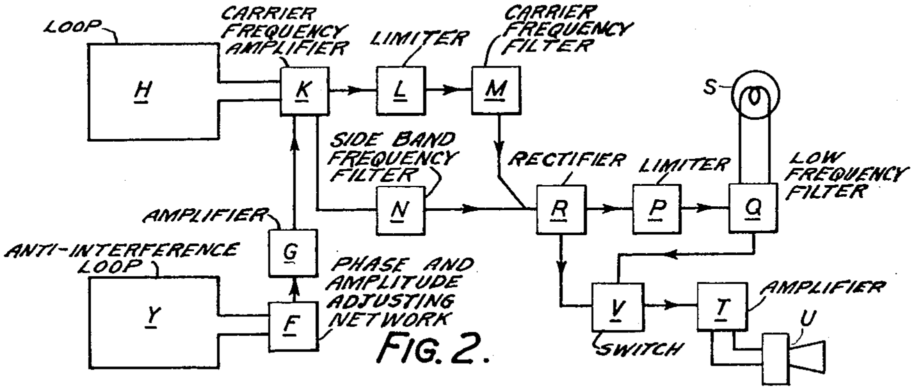

In the accompanying drawings:

FIG. 1 is a block diagram showing the arrangement of an acknowledgment receiving apparatus connected to a loop, FIG. 2 is a block diagram of a modified arrangement, and FIGS. 3–7 are circuit diagrams showing various constructions of portable transmitter.

Referring first to FIG. 1, loop X feeds a selective amplifier A which is tuned to the carrier frequency. The signal from A, which is fed to a rectifier B and thence to a selective filter C, is detected by a unit D, to operate the indicating lamp E. This lamp may be replaced by a sound-producing device, or by a mechanical indicator. An anti-interference loop Y feeds an interference signal through a phase and amplitude-adjusting network F and amplifier G, into the input to A, in parallel or in series with loop X, to neutralise external interference.

FIG. 2 shows a modification of the arrangement illustrated in FIG. 1. This enables a higher degree of selectivity to be obtained with the acknowledgment signals and also provides for the reception of emphasised side-band speech signals. Here the loop H feeds a selective amplifier K, which is broadly tuned to the carrier frequency. From this filter part of the signal passes to a limiter L and a very selective filter M which is tuned to the carrier frequency. Part of the signal from K is also passed without being limited to a filter N, which is tuned to the side-band frequency of the speech, which includes the side-band frequency of the acknowledgment note. The outputs from M and N are mixed and fed to a rectifier R. The rectified signal from R is fed to a limiter stage P and then to a very selective low-frequency filter Q, which serves to operate an acknowledgment lamp S and also a switching device V. When the switching device V is operated, the output from the rectifier R also passes to an amplifier T to operate a loudspeaker U. In the arrangement shown, an anti-interference loop Y has its output also fed into K through phase and amplitude adjusting network F and amplifier G, as in FIG. 1. The arrangement of FIG. 2 may, of course, be used for the more selective reception of an acknowledgment signal, without the provision of speech.

Figure 3:
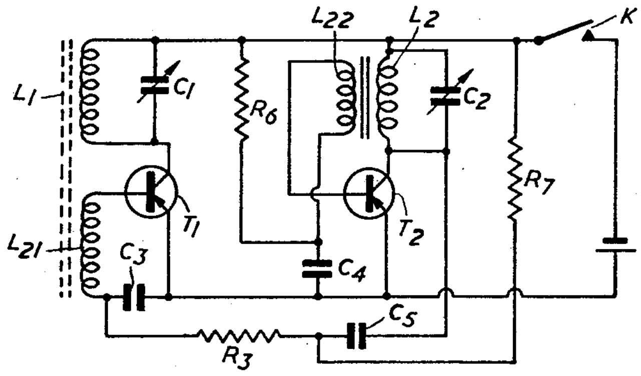

Referring now to the acknowledgment transmitter illustrated in FIG. 3, a transistor T1 oscillates at the frequency of a ferrite rod aerial L1 and tuning condenser C1 by virtue of a feedback winding L21 connected between the base and the emitter of T1 through a condenser C3, which serves as a by-pass for the carrier frequency, but not for the modulation frequency employed, negative bias being supplied to the base of T1 through resistors R7 and R3. The circuit is tuned to give the carrier frequency required.

A transistor T2 oscillates at the modulation frequency determined by a transformer L2 and a condenser C2, a feedback winding L22 of the transformer being connected between base and emitter through a by-pass condenser C4, negative bias being supplied to the base through a resistor R6. Signals of this frequency are fed back through a condenser C5 and the resistor R3 to modulate the supply of current through R3 and the secondary of L1 to the base of transistor T1 and hence modulate the oscillation of T1. Instead of employing variable condensers C1 and C2, these condensers may be fixed and the inductances L1 and L2 adjusted by permeability tuning.

Figure 4:
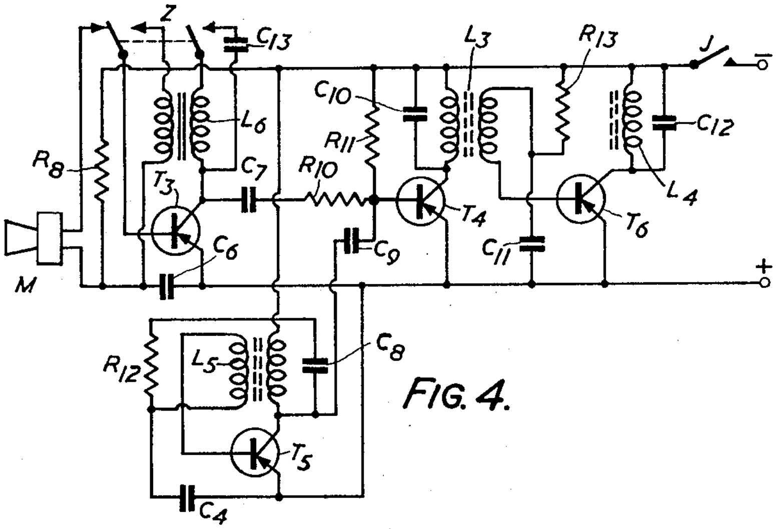

FIG. 4 illustrates a small portable transmitter for transmitting speech with emphasized side-band, in addition to the acknowledgment signals. The speech signal from a microphone M is fed between the base and emitter of a transistor T3 through the by-pass condenser C6, bias reaching the base through a resistor R8. The output from the collector of T3 is fed through a condenser C7 and a resistor R10 to the base of a transistor T4, which receives bias through a resistor R11. A transistor T5 oscillates at the carrier frequency by virtue of an inductance L5, tuned with a condenser C8 and having a feedback winding coupled between the base and emitter of T5 through a by-pass condenser C4, the bias being fed to the base of T5 through a resistor R12. Oscillations from this transistor (T5) are fed through the condenser C9 to the base of T4 and are modulated by the audio frequency signals, applied to the base through a resistor R10. The output from T4 is coupled to a transistor T6 through a transformer L3, which is tuned with a condenser C10. This transformer is tuned to the side-band to be passed but sufficiently broadly to allow through a certain amount of the carrier. Bias for the base of T6 is supplied through a resistor R13 to a by-pass condenser C11. The collector circuit of T6 contains a ferrite-cored aerial L4 tuned to the side-band frequency to be transmitted by means of a condenser C12.

The switch Z, comprising a change-over and a make-contact, serves to change over from "Speech" to "Call" by switching the base of the transistor T3 from the microphone to a secondary on a transformer L6 and at the same time connecting a tuning condenser C13 across the primary of this transformer. A switch J serves to switch on the transmitter. Both J and Z may be finger-operated press buttons.

Figure 5:
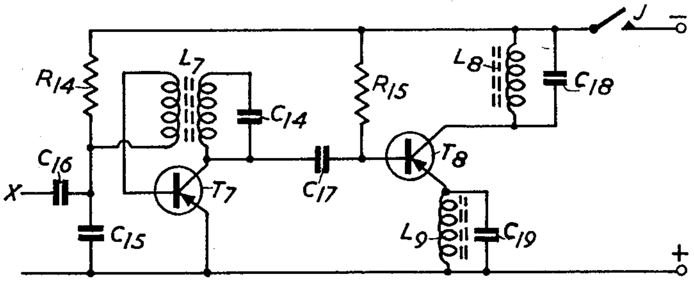

FIG. 5 shows an alternative method of coupling the modulated oscillator to the output stage so as to transmit predominantly single side-band. A transistor T7 oscillates at a frequency determined by a tuned transformer L7 and condenser C14. Feedback from the secondary of the tuned transformer is applied between the base and emitter of T7 through a signal frequency by-pass condenser C15. Audio-frequency signals to modulate the oscillation are fed in through a condenser C16. The modulated carrier frequency output from T7 is fed through a condenser C17 to the base of an output transistor T8. In the collector circuit of this transistor is a ferrite rod aerial L8 tuned by a condenser C18 to the side-band frequency. A tuned circuit comprising an inductor L9, tuned by a condenser C19 to the carrier frequency, is inserted in the emitter of T8, thereby introducing feedback at the carrier frequency and preventing the output stage becoming heavily loaded at this frequency. The values of L9 and C19 should be so chosen that the impedance of L9 and C19 is several times the normal input impedance of T8 at the carrier frequency. Bias is supplied to the transistor T8 through a resistor R15. The oscillator may be switched on by means of the switch J.

In the transmitters described in FIGS. 3, 4 and 5, all the transistors may be of a low-rated type, except for the output stages which may have ratings of the order of 100 milliwatts. The tuned transformers may conveniently be wound on ferrite pot cores, e.g. 18 mm. diameter, and the ferrite rod aerials L2, L4 and L8 may be about 2½" long x ¼" diameter, although greater range may be obtained by using larger aerials where portability requirements permit.

Figure 6:
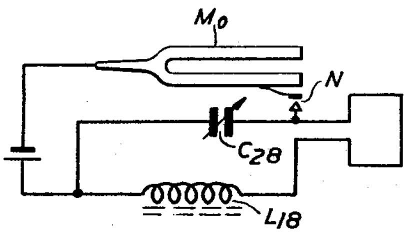

In FIG. 6 the aerial is a loop in series with a ferrite rod L18 and these are together tuned by a condenser C28. Current is passed intermittently through contacts N controlled by a mechanically tuned vibrator M*o*, such as a tuning fork on tuned reed.

Figure 7:
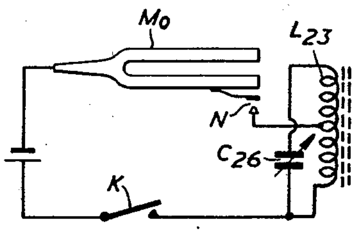

In FIG. 7 the aerial consists of a ferrite rod with a winding L23 tuned by a condenser C26. Current impulses are fed through part of the winding by a tuning fork M*o* which opens and closes contacts N. K is an On-Off switch.

In the appended claims, "near the loop" means within the loop or outside the loop to a distance of not more than twice the maximum width thereof. By "pocket transmitter" is meant a transmitter which can be put in the pocket or otherwise worn by a person using the device without causing him inconvenience during normal activity.

I claim:

Apparatus for communication by magnetic induction, comprising a signal transmitting and receiving loop, a pocket transmitter near said loop, said transmitter including a transistor oscillator which operates at a frequency of at least 15 kilocycles, means for modulating the output of said transistor oscillator with an audio signal, a ferrite inductor tuned to an audio frequency side band, and a filter connected between the output of said modulating means and said ferrite inductor, said filter having a characteristic to reduce the carrier in relation to said side band, a receiver connected to said loop, said receiver including a first resonant circuit connected to the loop and tuned to the frequency of said transistor oscillator, a second resonant circuit connected to the output of said first resonant circuit and tuned to the frequency of said side band, at least one interference pick-up coil, a phase shifting network connected to said pick-up coil, an amplifier connected to the ouput of said phase shifting network, means connecting the output of said amplifier to the first resonant circuit and arranged to feed thereto interference picked up by said coil in anti-phase relation to the output from said loop, demodulation means connected to the outputs of said first resonant circuit and second resonant circuit, and an indicator connected to the output of said demodulation means and arranged to be energized thereby upon detection of a transmitted signal.

References Cited in the file of this patent

UNITED STATES PATENTS

| | | |
|---|---|---|
| 1,006,429 | Brown | Oct. 17, 1911 |
| 1,993,436 | Eberhard | Mar. 5, 1935 |
| 2,362,692 | Goldberg | Nov. 14, 1944 |
| 2,405,501 | Halstead | Aug. 6, 1946 |
| 2,499,177 | Baughman | Feb. 28, 1950 |

FOREIGN PATENTS

| | | |
|---|---|---|
| 7607/27 | Australia | June 2, 1927 |
| 35,726 | France | Mar. 27, 1930 |